(12) United States Patent
Fries et al.

(10) Patent No.: US 11,044,847 B2
(45) Date of Patent: Jun. 29, 2021

(54) CUTTER HEAD WITH AUTOMATIC SETTING OF THE REEL FINGER ORIENTATION

(71) Applicant: Deere & Company, Moline, IL (US)

(72) Inventors: Christina Fries, Nohfelden (DE); Friedrich Lauer, Kraehenberg (DE); Eric Loutz, Zweibruecken (DE); Lutz Bischoff, Nuenschweiler (DE); Oliver Klein, Saarwellingen (DE); Dirk Weichholdt, Woelfling les Sarreguemin (FR)

(73) Assignee: DEERE & COMPANY, Moline, IL (US)

( * ) Notice: Subject to any disclaimer, the term of this patent is extended or adjusted under 35 U.S.C. 154(b) by 161 days.

(21) Appl. No.: 16/394,933

(22) Filed: Apr. 25, 2019

(65) Prior Publication Data

US 2019/0327892 A1    Oct. 31, 2019

(30) Foreign Application Priority Data

Apr. 26, 2018    (DE) .......................... 102018206507.1

(51) Int. Cl.
| | |
|---|---|
| *A01D 41/14* | (2006.01) |
| *A01D 34/28* | (2006.01) |
| *A01D 57/12* | (2006.01) |
| *A01D 57/03* | (2006.01) |

(52) U.S. Cl.
CPC ......... *A01D 41/141* (2013.01); *A01D 34/283* (2013.01); *A01D 57/03* (2013.01); *A01D 57/12* (2013.01)

(58) Field of Classification Search
CPC .......................... A01D 41/141; A01D 34/283
USPC ....................................................... 56/10.2 R
See application file for complete search history.

(56) References Cited

U.S. PATENT DOCUMENTS

| | | | | |
|---|---|---|---|---|
| 5,768,870 A | * | 6/1998 | Talbot .................... | A01D 57/03 56/220 |
| 5,937,621 A | * | 8/1999 | Eggenhaus .......... | A01D 41/141 56/10.2 E |
| 6,170,244 B1 | | 1/2001 | Coers et al. | |

(Continued)

FOREIGN PATENT DOCUMENTS

| | | |
|---|---|---|
| DE | 1047516 B | 12/1958 |
| DE | 2411153 A1 | 9/1975 |

(Continued)

OTHER PUBLICATIONS

European Search Report issued in counterpart application No. 19169583.2 dated Sep. 13, 2019. (7 pages).

*Primary Examiner* — Thomas B Will
*Assistant Examiner* — Matthew Ian Neal

(57) ABSTRACT

A cutter head for a harvester, with a cutterbar for cutting crop from a field, a reel with reel fingers which is disposed above the cutterbar, and a cross conveyor for transporting the cut crop to a rear discharge opening. The reel includes reel arms that can be driven about a rotating axis, reel finger carriers supported on the reel arms so they can rotate about the lengthwise axes of the arms, with reel fingers mounted thereon, and an externally powered actuator connected to an electronic control unit for adjusting the rotary angle of the reel finger carrier relative to the reel arms.

9 Claims, 4 Drawing Sheets

(56) References Cited

U.S. PATENT DOCUMENTS

| | | | | |
|---|---|---|---|---|
| 6,442,918 | B1* | 9/2002 | Fox | A01D 57/03 |
| | | | | 56/220 |
| 6,591,598 | B2* | 7/2003 | Remillard | A01D 57/03 |
| | | | | 56/221 |
| 8,800,256 | B2 | 8/2014 | Swenson | |
| 9,301,446 | B2* | 4/2016 | Peters | A01D 41/127 |
| 9,763,385 | B2* | 9/2017 | Digman | A01D 41/141 |
| 2013/0160418 | A1 | 6/2013 | Sauerwein et al. | |
| 2016/0183465 | A1* | 6/2016 | Honey | A01D 45/00 |
| | | | | 56/226 |
| 2018/0242525 | A1* | 8/2018 | Schwinn | A01D 57/02 |
| 2018/0332768 | A1* | 11/2018 | Isaac | A01D 75/287 |
| 2019/0082601 | A1* | 3/2019 | Honey | A01D 57/04 |
| 2020/0214208 | A1* | 7/2020 | Shearer | A01D 57/04 |

FOREIGN PATENT DOCUMENTS

| | | |
|---|---|---|
| DE | 102016215197 A1 | 3/2017 |
| DE | 102016202628 A1 | 8/2017 |
| DE | 102016118637 A1 | 4/2018 |
| EP | 0812530 A1 | 12/1997 |
| EP | 1297735 A1 | 4/2003 |
| EP | 2143316 A1 | 1/2010 |
| EP | 2517549 A1 | 10/2012 |
| EP | 2803257 A1 | 11/2014 |
| WO | 03049532 A1 | 6/2003 |
| WO | 2016101059 A1 | 6/2016 |

* cited by examiner

CUTTER HEAD WITH AUTOMATIC SETTING OF THE REEL FINGER ORIENTATION

RELATED APPLICATIONS

Priority is claimed to German Patent Application No. 102018206507.1, filed 26 Apr. 2018, which is hereby incorporated by reference herein.

FIELD OF THE DISCLOSURE

The present disclosure relates generally to a cutter head for a harvester.

BACKGROUND OF THE DISCLOSURE

Cutter heads are used in agriculture as harvesting heads for self-propelled harvesters in the harvesting of grains, as a rule for combine harvesters, although they can also be used as harvesting heads for forage choppers, for example in the harvesting of whole plant silage. Cutter heads comprise a cutterbar, a reel disposed above the cutterbar, and a cross conveyor, which delivers the cut crop to an inclined conveyor of the combine harvester or a feeder conveyor of the forage chopper. The reel serves to engage the standing crop and to transport it to the rear, so that it can be cut by the cutterbar and picked up by the cross conveyor. The reel usually comprises a number of reel finger carriers, which are mounted on reel arms, which in turn can be rotated about a central axis extending in the transverse direction. Since the reel finger carriers are mounted rotatably relative to the reel arms, over a revolution the fingers in the prior art are not oriented radially relative to the axis of rotation of the reel arms, but rather are oriented essentially downward, which is achieved by an appropriate control, which can follow a suitably shaped preset system, for example in the form of a control curve using cam tracks (U.S. Pat. No. 6,170,244 B1), or chains (DE 1 047 516 B), or gears (WO 2016/101059 A1), for example.

The harvesting of threshable crops with high throughput and in high quality begins at the cutter head. The reel supports the pickup of crop and proper use contributes considerably to a uniform material flow and to low cutter head losses. In the opposite case, however, if the parameters are set incorrectly, high cutter losses can occur and uneven material flow can negatively affect the function of all subsequent threshing and separating devices, reducing the efficiency of the entire combine. Proper adjustment of all adjustable reel parameters requires a lot of experience from the machine operator.

Moreover, because of improved planting measures, stands with uniform disruptions (for example lodged crop) over large areas are rather rare, but fields with different crop conditions in adjacent partial areas are more common (for example, from weather conditions or from damage by wild game) (weather-related problems or head losses arise if parameters are wrongly set, and the functioning of all of the subsequent threshing and cutting elements is adversely affected by uneven material flow, whereupon the efficiency of the entire combine harvester drops. Proper adjustment of all of the adjustable reel parameters requires a great deal of experience on the part of the combine operator). The operator then needs to adjust several reel parameters at the same time and quickly. This becomes more and more difficult because of increasingly higher harvesting speeds and wider cutter heads.

Often one sees strips with lodged crop in a field. These strips can be caused by overlap during the application of fertilizer. The partial over-fertilization can lead to lodged crop. Such lodged crop locations, which do not extend over the entire cutter head width, are especially difficult to manage. The adjustment of the cutter head is then always only a compromise relative to the normal standing crop and the lodged crop, and here, too, rapid adjustment of several adjustment parameters is necessary.

Adjustable parameters of the reel include the rotary speed, the height, and the forward position. An automatic adjustment of these parameters based on detected crop parameters like the stand height was already proposed in the prior art (EP 2 517 549 A1, DE 10 2016 118 637 A1).

Another adjustable parameter of the platform is the orientation of the reel fingers around the axis of rotation of the reel finger carriers. In the prior art, this adjustment was carried out by a mechanical setting of a lever mounted on the reel (see, for example, DE 1 047 516 B), so as to match the orientation of the reel fingers to the crop type and conditions. A readjustment during the harvesting operation then is either not possible or only possible with high expenditure of time, even though conditions on a field are expected to change during the harvest. U.S. Pat. No. 8,800,256 B2 describes a reel apparatus with a reel finger angle adjustment ring, which can be adjusted by an actuator so as to adjust the angle of the reel fingers during a revolution. The adjustment is made by an operator in the cabin of the combine harvester or is made automatically based on the drive speed of the combine harvester or the rotary speed of the reel. A remotely controlled adjustment of the orientation of the reel fingers is also mentioned in EP 1 297 735 A1, but with the note that automation of the independent adjustment of the rotary angle of all reel finger carriers will probably be less desirable because of its great complexity. Finally, DE 24 11 153 A1 describes a cutter head of a combine harvester, in which the height of the reel is automatically guided at the top of the crop stand by means of a photoelectric sensor. If, in the case of lodged crop, the reel is guided all the way down, an automatic adjustment of the angle of the reel fingers downward takes place via a positive mechanical coupling in order to be able to pick up the crop better.

SUMMARY OF THE DISCLOSURE

Accordingly, the prior art provides for adjustment of the orientation of the reel fingers only by hand, or (U.S. Pat. No. 8,800,256 B2), if necessary, to adjust it automatically independently of the forward speed of the combine harvester, or (DE 24 11 153 A1) to adjust it by means of a mechanical coupling to the reel height if there is lodged crop. This does not result in an optimum pickup of crop in all cases.

A cutter head for a harvesting machine is provided with a cutterbar for cutting crop from a field, a reel with reel fingers disposed above the cutterbar, and a cross conveyor for delivery of the cut crop to a rear discharge opening. The reel comprises reel arms that can be driven about an axis of rotation, reel finger carriers mounted on the reel arms so they can rotate about the lengthwise axes of the arms, with reel fingers mounted thereon, and an externally powered actuator connected to an electronic control unit for adjustment of the rotary angle of the reel finger carriers relative to the reel arms. The electronic control unit can be operated to adjust the actuator in dependence on at least one property of the crop that is to be harvested.

In other words, a system is proposed for improved utilization of the functionality of a crop header in the harvesting of threshable grain, in which an additional, remotely controlled, setting of the orientation of the reel fingers of the header reel and its incorporation in algorithms for semiautomatic or completely automatic adjustment of said parameters. The system is especially suitable for picking up lodged crop and achieves the highest efficiency in connection with an optical sensor, which already can detect places with lodged crop and the orientation of the lodged crop in the field in front of the cutter head. A further improvement is possible if said sensor or an additional optical sensor can also monitor the region around the cutterbar up to the cross auger for uniform material flow or for plugging. Said sensor should also detect if wrapping of the reel begins or if cut crop is being tossed over the reel toward the front.

Accordingly, the property of the crop to be harvested concerns in particular the orientation of the crop stalks, i.e., if it is standing or lying (lodged crop) and, in the latter case, also the direction in which the lodged crop lies, and/or the transport behavior of the crop in the pickup region of the cutter head, in particular possible transport disruptions at the cutterbar, at the cross conveyor, or between them, or wrapping of the reel.

The property can be detectable by a sensor and/or entered into a map and/or transmittable to the control unit by means of an operator interface.

The electronic control unit can be operable by requesting, by means of the signals of the operator interface, an adjustment of the actuator that is suitable for pickup of lodged crop and/or for remedying a disruption of the transport behavior of the crop in the pickup region of the cutter head.

The operator interface can be configured to receive an input from the operator about the orientation of the lodged crop and the electronic control unit can be operable to control the actuator by means of the input.

The electronic control unit can be connected to a memory, in which are stored various settings for adjustment of the actuator in dependence on the presence and, possibly, the orientation of lodged crop that is to be picked up and/or a disruption of the transport behavior of the crop in the pickup region of the cutter head, as well as other settings that are dependent on the presence and, possibly, the orientation of lodged crop that is to be picked up, for control of actuators for adjusting the cutter head height and/or the position of the reel in the forward direction and/or the position of the reel in the vertical direction and/or the speed of rotation of the reel. Memory systems in which factory or customer-specific base settings for the cutter head position (cutting height), reel height and forward position, and reel speed are stored and can be activated at the push of a button are already common. This system is upgraded, for one thing, for the storage of the reel finger tilt and, for another, to the storage and retrieval of other data sets for one or more operating states that differ from the base setting (for example, lodged crop or disruption of transport behavior of the crop in the pickup region of the cutter head).

The electronic control unit can be connected to a sensor for detection of lodged crop in front of the cutter head and, preferably, its orientation and/or a stored map, in which locations of lodged crop in front of the cutter head and, preferably, its orientation are stored and/or to a sensor for detection of disruptions in the transport behavior of the crop in the pickup region of the cutter head, and can be operated to control the actuator in dependence on the map and/or the signals from at least one of the sensors.

The electronic control unit can accordingly be operable to control the actuator in dependence on the presence and, possibly, the orientation of lodged crop to be picked up.

Alternatively or in addition, there is the possibility of resolving congestion or plugging automatically with the reel, if a sensor detects disruptions in the material flow of the crop in the pickup region of the cutter head, i.e., in the region of the cutterbar or in front of the cross conveyor.

The control unit can be operable to control additional actuators for adjustment of the cutter head height and/or the position of the reel in the forward direction and/or the position of the reel in the vertical direction and/or the speed of rotation of the reel on the basis of signals of at least one sensor and/or data entered into the map.

The cutter head is used in connection with a harvesting machine, which can be a combine harvester or forage chopper.

The cutter head for a harvesting machine is provided with a cutterbar for cutting crops from a field, a reel with reel fingers disposed above the cutterbar, and a cross conveyor for transport of the cut crop to a rear discharge opening. The reel comprises reel arms which can be driven about an axis of rotation, reel finger carriers supported rotatably around their lengthwise axes on the reel arms and having reel fingers mounted thereon, and an externally powered actuator connected to an electronic control unit for adjustment of the rotary angle of the reel finger carriers relative to the reel arms. The electronic control unit can be operated to adjust the actuators in dependence on at least one parameter of the crop to be harvested.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
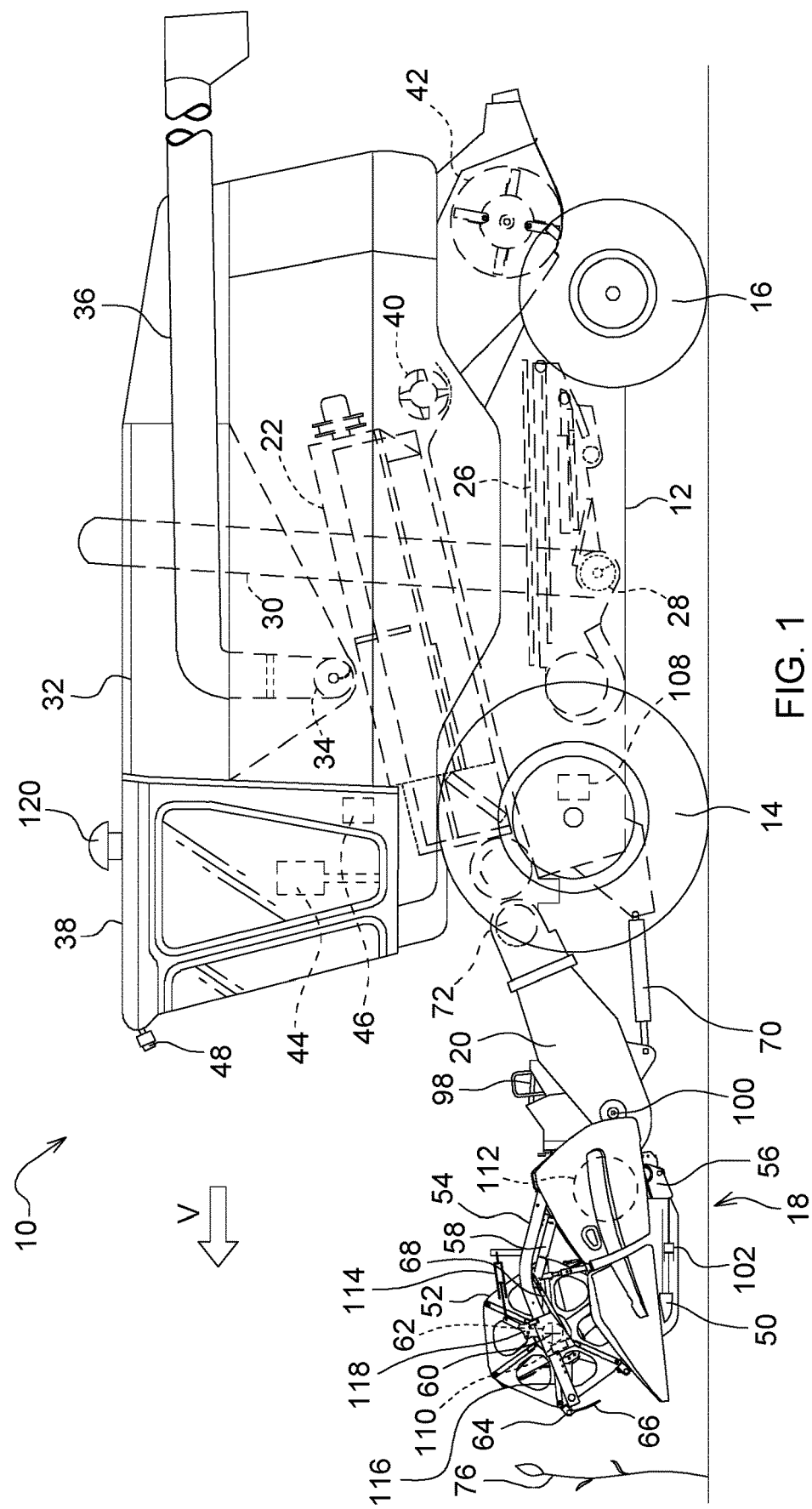
FIG. 1 shows a side view of a self-propelled combine harvester with a header.

FIG. 1 shows a self-propelled harvesting machine 10 in the form of a combine harvester. It comprises a supporting chassis 12, which is supported on the ground by front drive wheels 14 and steerable rear wheels 16 and can be moved over a field by wheels 14 and 16 in a forward direction V. Wheels 14 and optionally 16 are put into rotation by drive means (not shown) in order to move the harvesting machine 10 over a field that is to be harvested. In what follows, directional data such as forward or backward or sideways refer to the forward direction V of the harvesting machine 10, which runs to the left in FIG. 1.

Harvesting Machine

A harvesting head in the form of a cutter head 18 is separably attached to the front of the harvesting machine 10 in order to be able to remove crop 76, in the form of grain or other threshable crop, from the field during the harvesting operation and to feed it up and to the rear through an inclined transport structure 20 to an axial threshing structure 22. The mixture of grain and other material that passes through threshing drums or sieves of the axial threshing assembly 22 goes to a cleaning shoe 26. Clean grain obtained from the cleaning shoe 26 is sent via a grain auger 28 to a grain elevator 30, which transports it into a grain tank 32. The clean grain in grain tank 32 can be transferred to a transport vehicle by a discharge system with a cross auger 34 and a discharge auger 36. The crop residues expelled by the axial threshing system 22 are sent by a transport drum 40 to a straw chopper 42, which chops it and spreads it over the field over the width of the cutter head. Said systems are driven by an internal combustion engine and are controlled by an operator in a cabin 38. Said axial threshing system 22, with one or more axial threshing and separator rotors, is only an explanatory example and can be replaced by a tangential threshing system with one or more threshing drums followed by straw walkers or separator rotors.

Cutter Head

The cutter head 18 comprises a cutterbar 50, which moves back and forth and which extends essentially over the entire width of the cutter head 18. The cutterbar 50 can, as is known in the prior art, be rigid or flexible. A reel 52 is mounted on the cutter head 18 and extends essentially over the entire width of the cutter head 18 (or a part thereof). The outer ends of the reel 52 are supported on arms 54, of which only one is shown in FIG. 1. The arms 54 have rearward ends, which pivot on axes extending transverse to the forward direction on the cutter head 18 frame 56, which likewise extends over the width of the cutter head 18, and which extend forward from there. Each arm 54 is coupled to an actuator 58 in the form of a hydraulic cylinder, which can pivot on frame 56 and on arm 54. The arms 54 and thus the reel 52 are lowered and raised by an adjustment (retraction and extension) of actuator 58.

On a central tube 62, which can be rotated (counterclockwise in FIG. 1) by a controllable drive 110 during the harvesting operation, reel finger carriers 64 are supported via reel arms 116, which extend radially to tube 62 and which extend over the width of the cutter head 18 or a part thereof and on which reel fingers 66 are mounted. A second actuator 68, in the form of a hydraulic cylinder, is adjusted to set the horizontal position of the reel 52 by moving a support bearing of the tube 62 along the arm 54. The cutter head 18 also comprises a cross conveyor 112, which can be designed as an auger conveyor (as shown) or a conveyor belt, in order to transport the crop cut by the cutterbar 50 to the middle of the cutter head 18 and from there to feed it through a rear opening in frame 56 to the inclined conveyor 20. The height of the cutter head 18 above the ground is defined by a fourth actuator 70, which pivots the inclined conveyor 20, and thus the separably attached cutter head 18, relative to the chassis 12 of the harvesting machine 10 about a horizontal axis 72 extending transverse to the forward direction. The actuator 70 is controlled by an electronic control unit 46 based on an operator input via an operator interface 44 or automatically, where the electronic control unit 46 keeps the cutter head 18 at a desired height above the ground or guides it over the ground at a desired pressure. As is known in the prior art, the cutter head 18 can additionally pivot about a horizontal axis extending in the forward direction in order to follow the contour of the ground and can also be controlled by the control unit 46 and an associated actuator. An actuator 98 can control the tilt of the cutter head 18 about the transverse axis relative to the inclined conveyor 20.

The length of the cutting platform can be controlled by an actuator 102. Accordingly, the horizontal position of the cutterbar 50 relative to the frame 56 of the cutter head 18 is adjustable via the actuator 102, which is controlled via the operator interface 44 and the electronic control unit 46.

Possible embodiments of a cutter head 18 with length-variable cutting platform are shown in EP 2 803 257 A1 and WO 03/049532 A1.

The reel finger carriers 64 and thus the reel fingers 66 are rotatably mounted relative to the reel arms 116, which enables the reel fingers 66 to be kept in a desired orientation, as a rule an approximately vertical orientation, over the entire rotation around the tube 62. Substantially known mechanisms are used for this (see DE 1 047 516 B, WO 2016/101059 A1, U.S. Pat. No. 8,800,256 B2 and EP 1 297 735 A1, the disclosures of which are incorporated into these documents by reference), in order to control the rotary position of the reel finger carriers 64 relative to the reel arms 116 in dependence on the rotary position of the reel arms 116 around the axis of rotation of the tube 62. The exact angular position of the reel finger carriers 64 can be changed via a lever 118, which, for example, sets the position of a cam track about the central axis of the tube 62. An additional actuator 114 is provided in order to adjust the lever 118. Accordingly, the actuator 114 can vary the angle of the reel finger carriers 64 around the reel arms 116.

The lever mechanism used in the prior art (see DE 1 047 516 B) for manual setting of the tilt of the reel fingers 66 is accordingly replaced at one of the two ends of the reel 52 by an actuator 114. This can be electric, hydraulic, or pneumatic. A position measurement (sensor 122) helps to be able to determine the actual tilt or to rapidly run up to the desired tilt. The position measurement can be used to be able to set both sides synchronously, or even to be able to specifically adjust the tilt over the width. In this way, the material- and structure-related flexibility of the reel 52 is utilized. If the reel 52 is composed of a plurality of reels 52 disposed side by side, each reel 52 can be equipped with one or two actuator(s) 114, which can be independently controlled if different crop conditions are present over the cutter head width.

The control unit 46 can additionally control an actuator to set the drive speed of the harvesting machine 10.

Control of the Cutter Head

Figure 2:
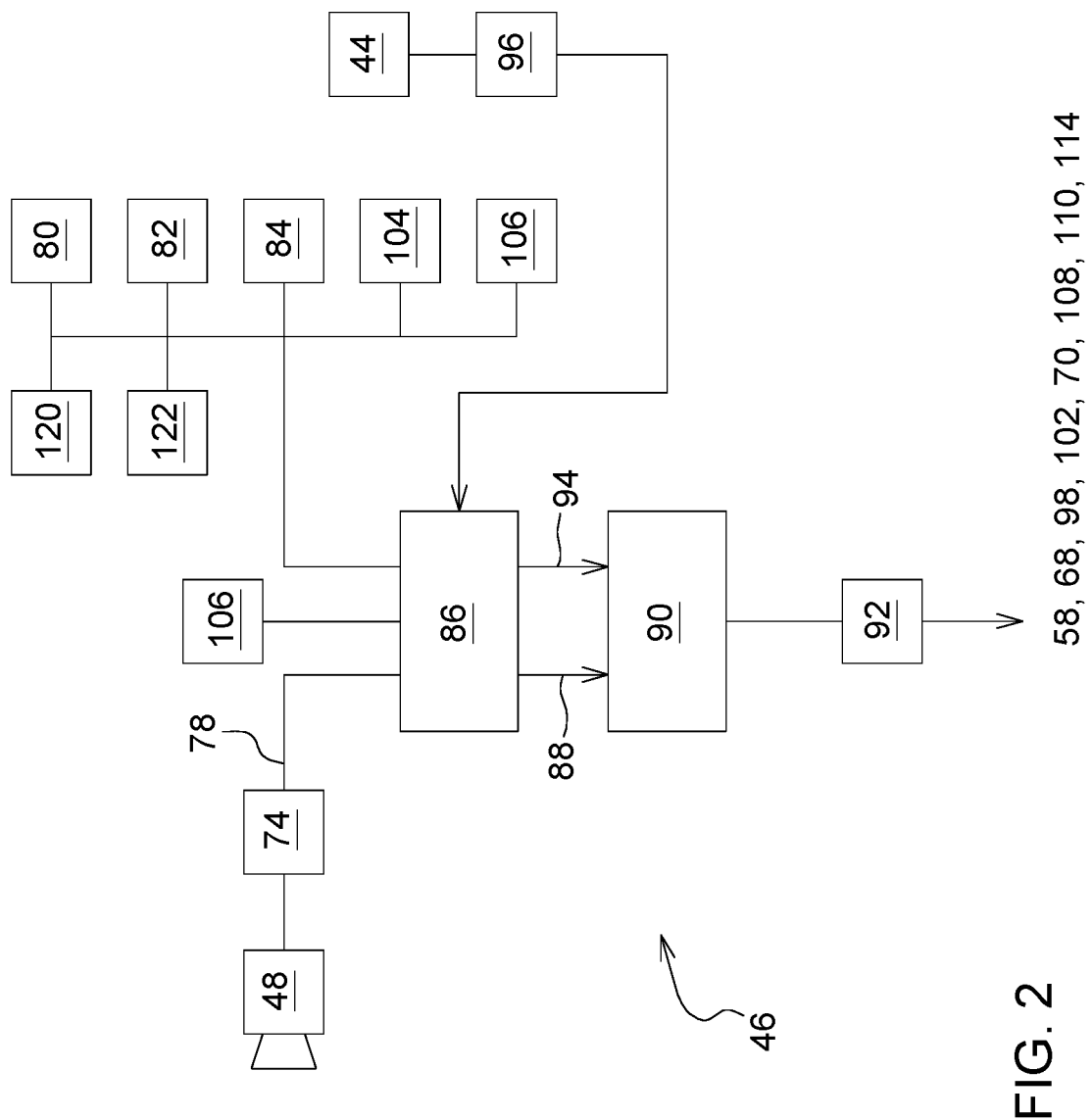
FIG. 2 shows a block diagram of the electronic control unit with the relevant sensors and actuators.

FIG. 2 shows the electronic control unit 46 and the connected sensors and activators in detail. The electronic control unit 46 comprises a processing unit 86 and a control unit 90.

A camera 48 is mounted at the front of the roof of the cabin 38 and serves to record the crop 76 in front of the harvesting machine 10. An imaging processing unit 74 receives the image signals of camera 48 and sends signals 78 to the processing unit 86.

The processing unit 86 also receives signals from a position determining device 120, a sensor 122 to record the position of actuator 114, a sensor 80 to record the position of actuator 58, a sensor 82 to record the position of actuator 68, a sensor 84 to record the position of actuator 70, a sensor 104 to record the position of actuator 98, and a sensor 106 to record the position of actuator 102. The operator interface 44 is connected via a signal converter 96 to the processing unit 86, which is additionally connected to a memory 124. The control unit 90 receives, from the signal processing unit 86, signals 88 on the one hand, which contain the set values for the operating parameters or settings of the actuators 58, 68, 98, 102, 70, 108, 110, 114, and, on the other hand, signals 94, which contain the actual values of the operating parameters or positions of the actuators 58, 68, 98, 102, 70, 108, 110, 114 and outputs the corresponding control signals to the actuators 58, 68, 98, 102, 70, 108, 110, 114 (or drivers or valve units or the like, which are connected between the control unit and the actuators 58, 68, 98, 102, 70, 108, 110, 114), in order to adjust the actual values of the operating parameters to the set values.

It would also be possible to dispense with one or more of the sensors 122, 80, 82, 84, 104, and 106 or to supplement their signals by evaluating the signals of the camera 48 with the image processing system 74 in order to determine the current operating parameters of one or more of the actuators 58, 68, 98, 102, 70, 108, 114 or the current positions of the elements positioned by the relevant actuator. In this regard, one is referred to the Indian Patent Application No. 201821013464, filed Apr. 9, 2018, the disclosure of which is hereby incorporated by reference herein. The signals of camera 48 can also be evaluated by the imaging processing system 78 in order to generate steering signals for automatic steering of the harvesting machine 10 along the edge of the crop stand and/or to provide stand density-dependent speed output signals for actuator 108. The signals for providing set values for actuators 70 and possibly 98 and possibly for setting the cutter head 18 relative to the inclined conveyor 20 in the forward direction V can also be obtained by means of the signals of the camera 48.

First Embodiment for Control of the Cutter Head

Figure 3:
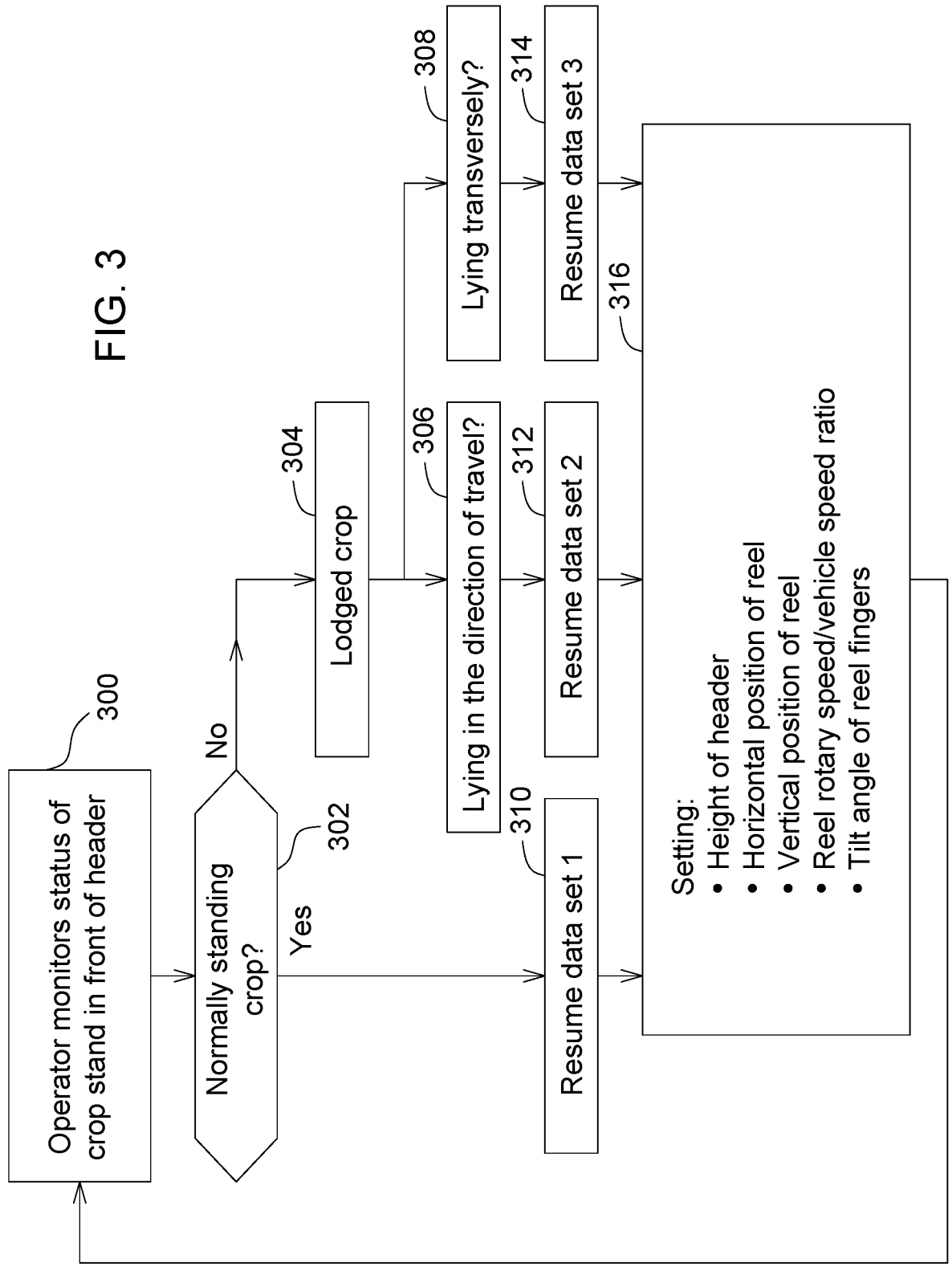
FIG. 3 shows a flow chart of a first procedure of the control unit.

A first possible mode of operation of the electronic control unit 46 is shown in FIG. 3. Here, three data sets are stored for settings of the actuator 70 for specifying the height of the cutter head 18 above the ground, the actuator 68 for the position of the reel 52 in the forward direction V, the actuator 58 for the vertical position of the reel 52, the rotary speed of the actuator 110 for specifying the rotary speed of the reel 52 (or the ratio between the reel speed and the forward speed of the harvesting machine 10), and the actuator 114 for the tilt angle of the reel fingers 66 are stored in memory 124. The first data set corresponds to the normal harvesting operation, the second data set corresponds to lodged crop lying in the direction of travel, and the third data set corresponds to lodged crop lying in the transverse direction.

In step 300, the operator monitors the state of the crop 76 in front of the cutter head 18. By actuating an assigned button at the operator interface 44 (or non-actuation of a button provided for input of lodged crop), he can report to the control unit 46 that normal crop is present (step 302). If this is the case, in step 310, the first data set is called up, and in step 316, the actuators 70, 68, 58, 110, and 114 are controlled by means of the first data set. If the operator reports via the operator interface 44 that lodged crop is present, for which a corresponding button can be actuated, step 304 follows, in which the direction of the lodged crop can be input (steps 306, 308), for which additional buttons can be provided at the operator interface 44. There is also the possibility of making the inputs of steps 302 to 308 by means of a small joystick at the operator interface 44. If the joystick is in the neutral position, this corresponds to an input of standing crop 76, while a joystick shifted forward or backward represents lodged crop lying in the forward direction V and a joystick shifted to the side represents lodged crop lying across the forward direction V. Similarly, the operator interface 44 can be equipped with buttons, of which one has a symbol oriented in the forward direction V and one a symbol directed transversely, for example an arrow, where the first symbol is associated with step 306 and the second symbol with step 308. In the case of lodged crop lying in the direction of travel, the second data set is called up in step 312, and in step 316, the actuators 70, 68, 58, 110, and 114 are controlled by means of the second data set. In the case of lodged crop lying across the direction of travel, the third data set is called up in step 314, and the actuators 70, 68, 58, 110, and 114 are controlled in step 316 by means of the third data set. Possible details for these data sets are explained in the discussion of the second embodiment of the procedure of the control unit 46.

Second Embodiment for Control of the Cutter Head

Figure 4:
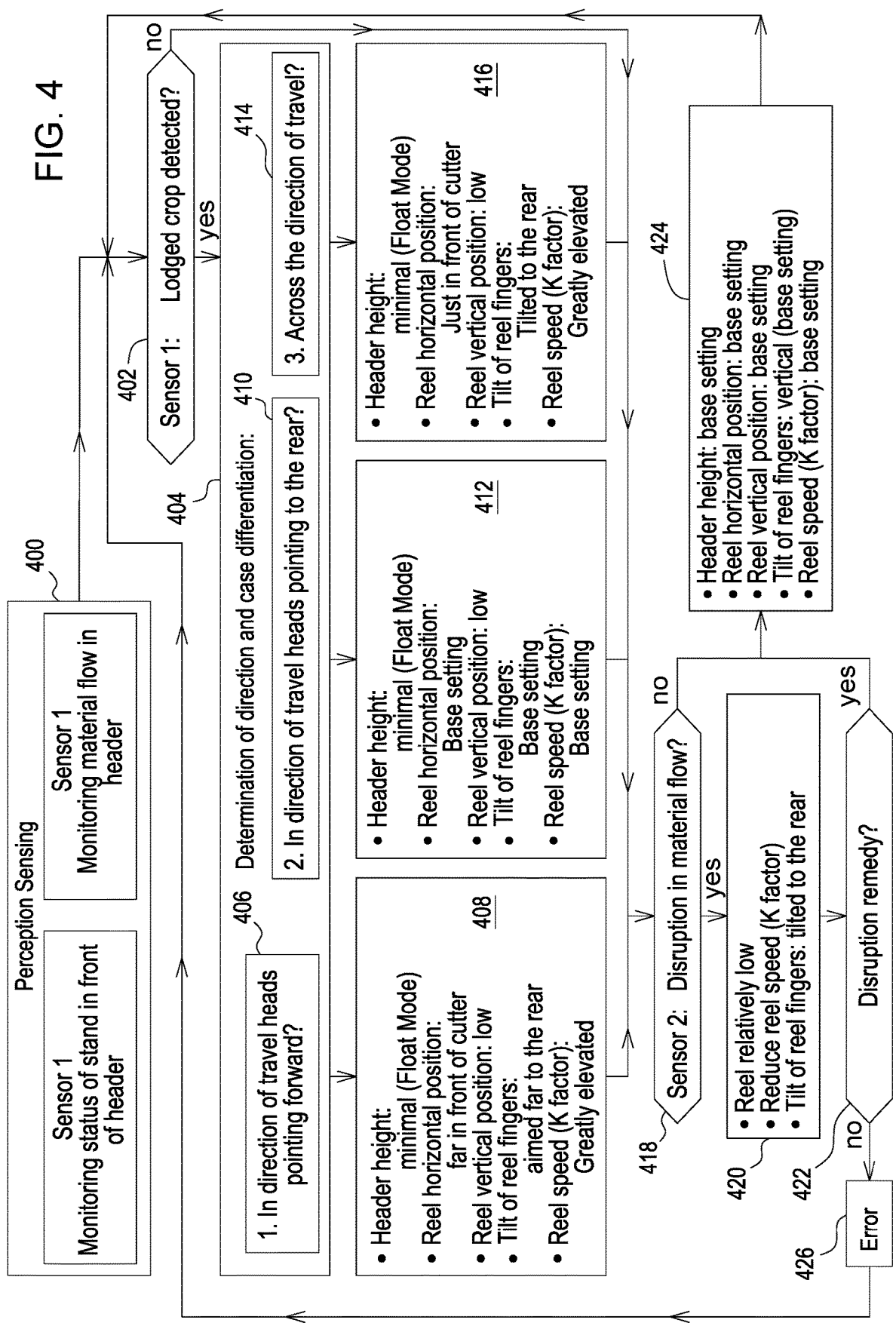
FIG. 4 shows a flow chart of a second procedure of the control unit.

FIG. 4 shows a second possible procedure of the electronic control unit 46. This automated procedure utilizes a first sensor for monitoring the state of the crop 76 in front of the cutter head 18 and a second sensor for monitoring the material flow in the cutter head 18. Preferably, the camera 48 with the image processing system 74 takes on the tasks of both sensors.

The first sensor serves to detected lodged crop that may lie in front of the cutter head 18. For this, one is referred to the disclosures of U.S. patent application 62/535,043 of Jul. 20, 2017 and DE 10 2016 215 197 A1, which are incorporated into these documents by reference. The image processing system 74 detects, by means of the image signals from camera 48, if and possibly in what orientation, lodged crop lies in front of the cutter head 18. Alternatively or in addition, this information can already have been obtained in advance, for example by means of a camera-equipped drone that has flown over the field, and it can have been stored in a map in memory 124 and read using the position determined with the position determining device 120 and the direction of travel of the harvesting machine 10.

The second sensor serves to monitor the material flow in the cutter head 18, in particular in the pickup region, i.e., in the region of the cutterbar 50 up to the cross conveyor 112. Here, too, the camera 48 can provide suitable images, which are evaluated by image processing system 74. In this regard, one is referred to the disclosures of EP 2 143 316 A1 and DE 10 2016 202 628 A1, which were incorporated into these documents by reference.

In step 400, the processing unit 86 accordingly receives the signals 78 from the image processing system, which indicate possible lodged crop or disruptions in the material flow in the pickup region of the cutter head 18.

Step 400 is followed by step 402, in which it is queried if the first sensor has detected lodged crop. If this is not the case, step 418 follows, in which it is queried if signals from the second sensor (i.e., the image processing system 74) indicate to the processing unit 86 that a disruption in the material flow is present in the pickup region of the cutter head 18 between the cutterbar 50 and the cross conveyor 112. If this is not the case, step 424 follows, in which the processing unit 86 calls up a series of base settings for the actuators 70, 65, 58, 110, and 114 from the memory 124. These base settings can have been input previously by the operator or can have been permanently set at the factory. The actuators 70, 68, 58, 110, and 114 are accordingly operated with meaningful operating parameters, which are well suited for ordinary conditions (standing crop 76). The reel 52 should support the collection of the crop only slightly. All settings are such that no grains are separated from the heads due to the reel 52, or separated grains cannot fall onto the ground in front of the cutter head. The reel fingers 66 should be set to be nearly perpendicular or only slightly to the rear. The reel 52 does not dip into the crop stand 76 until just before the cutterbar 50. The reel 52 stands at a height so that the reel finger carriers 64 can only make slight contact with the tips of the heads. As the reel fingers 66 dip into the crop, the relative motion between reel finger 66 and heads should only be minimal. The horizontal component of the reel speed is only slightly higher than the vehicle speed, so that the cut crop is pushed into the cutter head 18 only lightly. The reel speed/vehicle speed ratio is established with generally common systems for reel speed control. This setting of the four parameters can be stored as "base setting" and can be rapidly triggered each time by activating an assigned button at the operator interface 44, similar to step 310 in FIG. 3.

On the other hand, if it turns out in step 402 that the first sensor detects lodged crop, step 404 follows, in which the orientation of the lodged crop is determined by means of the signals of the first sensor via the image processing system 74, in which regard one is again referred to the disclosures of U.S. Provisional Patent Application No. 62/535,043, filed Jul. 20, 2017 and DE 10 2016 215 197 A1.

If the lodged crop lies in the direction of travel with the heads pointing forward (step 406), step 408 follows, in which the cutter head height (actuator 70) is brought to a minimum, i.e., the cutter head 18 is operated with actuator 70 in a float setting. The reel 52 is shifted as far forward as possible with actuator 68, so that the lowest point of the path of the reel fingers 66 is far ahead of the cutterbar 50. The reel 52 is brought by actuator 68 into a relatively low position, which lies below the base position in accordance with step 424. The tilt of the reel fingers 66 is set far to the rear with actuator 114, i.e., the reel fingers 66 at the lowest point of their travel extend relatively obliquely to the rear and downward from the reel finger carrier, i.e., at an angle of about 45° or up to 60°. Moreover, the rotary speed of the reel 52 is increased by the actuator 110, so that the "K factor," which is multiplied by the forward speed of the harvesting machine 10 to determine the rotary speed, lies much higher than in the base setting (step 424). These settings are especially suitable for picking up lodged crop whose heads point forward away from the cutter head 18, in particular within an angular range of +/−60° relative to the forward direction V.

Under such conditions, crop lifters are usually ineffective. The reel fingers 66 should go under the heads far in front of the cutterbar 50 to lift the crop 76 (grain) so that it can be cut and then lifted into the cutting system 18. The reel fingers 66 therefore are set far to the rear, up to 60° in the case of crop lying very flat. They should be able to slide under the heads on the ground. The reel 52 is set far to the front, so that the reel finger carriers 64 reach the deepest point of travel well in front of the cutterbar 50 and then come back up. The reel 52 is set so low that the reel fingers 66 can slide under the heads. The rotary speed of the reel 52 is noticeably increased, so that the crop 76 can be lifted sufficiently before the cut. The minimum rotary speed is such that at least the heads can be cut. With a further increasing reel speed, the straw can also be cut off lower. The use of this leeway is useful if less wet straw should get into the combine (there is a high risk that straw lying on the ground will be wetter) or lodged crop is present only over a part of the cutting width (the risk that wrapping of the reel will occur in the region with standing crop rises with increasing rotary speed). This setting of the four parameters can, as for step 312 in FIG. 3, be stored as a customer-specific setting for lodged crop lying in the direction of travel and can be triggered by an assigned button of the operator interface 44.

If the lodged crop lies with the heads to the rear in the direction of travel (step 410), step 412 follows, in which the cutter head height (actuator 70) is brought to a minimum, i.e., the cutter head 18 is operated with actuator 70 in a float setting. The reel 52 is set into the base position (as in step 424) with the actuator 68 in its forward direction. The reel 52 is brought by actuator 68 into a relatively low position, which lies below the base position according to step 424. The tilt of the reel fingers 66 is set to the base position (as in step 424) by the actuator 114. In addition, the speed of rotation of the reel 52 is set by the actuator 110 in the base position (as in step 424). These settings are especially suitable for picking up lodged crop whose heads point back toward the cutter head 18, in particular within an angular range of ±60° relative to the forward direction V.

In this case, crop lifters should be able to slip under the crop 76 easily and be able to lift it. Since the cutterbar platform slides under the crop 76 before the crop is cut, as a rule it slides easily into the cutter head 18 without additional support. The reel fingers 66 remain set in a vertical position. The horizontal position and the rotary speed remain at the base setting. If the crop lies over the entire cutting width or at least over most of the cutting width, the reel can be lowered in order to support pickup. If it lies only over a portion of the cutting width, the reel remains at the base setting height, or at the height corresponding to the level of the heads in the standing region. There is also the possibility of storing the settings according to step 412, for a setting of FIG. 3 for the case of crop 76 lying in the direction of travel with the heads oriented toward the rear, as a customer-specific setting and to trigger it via an assigned button of the operator interface 44.

If the lodged crop lies across the direction of travel (step 414), step 416 follows, in which the cutter head height (actuator 70) is brought to a minimum, i.e., the cutter head 18 is operated with actuator 70 in a float setting. The reel 52 is shifted forward by actuator 68, so that the lowest point of the path of the reel fingers 66 is slightly in front of the cutterbar 50. The reel 52 is brought by actuator 68 into a relatively low position, which lies below the base position according to step 424. The tilt of the reel fingers 66 is adjusted toward the rear with actuator 114, i.e., the reel fingers 66 at the lowest point of their travel extend from the reel finger carriers 64 to the rear and downward, but less steeply than in step 408. In addition, the rotary speed of the reel 52 is increased by the actuator 110, so that the K factor, which is multiplied by the forward speed of the harvesting machine 10 to determine the rotary speed, is much higher than in the base setting (step 424). These settings are especially suitable for collection of lodged crop lying across the cutter head 18.

In this case as well, it is not certain if crop lifters will always get sufficiently under the lodged crop or if they will slide over a portion of the lying crop and even press this portion downward. The reel 52 can help to place the crop 76 onto the crop lifters. The setting of the reel parameters takes place as in step 408, with the difference that the reel 52 now engages the crop just before the crop lifters. If crop lifters are not used, then the reel 52 engages the crop just in front of the cutterbar 50. This setting of the four parameters can be stored as for step 314 of FIG. 3 as a customer-specific setting for lodged crop lying in the direction of travel and can be triggered via an assigned button of the operator interface 44.

In intermediate positions of the lodged crop, which lie between the angles according to step 414 on the one hand and 406 or 410 on the other, there is the possibility that the processing unit 86 will utilize intermediate values of step 416 on the one hand and 408 or 412 on the other.

Steps 402, 408, 412, and 416 are followed by the above-mentioned step 418, in which it is queried if signals from the second sensor (i.e., the image processing system 74) indicate to the processing unit 86 that there is a disruption in the material flow in the pickup region of the cutter head 18 between the cutterbar 50 and the cross conveyor 112. If this is not the case, step 424 follows, and otherwise step 420, in which the processing unit 86 notifies, via control unit 90, the actuator 54 to raise the reel 52 somewhat (relative to the position according to step 408, 410, or 412) or (coming directly from step 402) to lower it relative to the normal position and optionally to reduce the rotary speed of the reel 52 via actuator 110, so that the K factor, which is multiplied times the forward speed of the harvesting machine 10 to determine the rotary speed, is lower than in the base setting (step 424). Also, the reel fingers 66 can be set tilted downward so that they can engage the accumulated material more aggressively. Accordingly, the reel 52 is in a relatively low position, to where the reel fingers 66 lightly brush over the cutterbar 50 or over the cutting platform. In stubborn cases, the reel speed is additionally increased.

In the following step 422, it is queried if the disruption was remedied. If this is the case, step 424 follows, and otherwise step 426. The engagement according to step 420 takes place preferably only briefly, on the one hand in order to guarantee that the sensor again has a clear view of the disruption and to test the result of the action, and on the other hand in order to reduce the risk that the reel 52 will eject cut crop or even begin to wrap. The sensor should be able to recognize these two cases also and quickly then interrupt an intervention intended to remedy the congestion. The same is true for cases of lodged crop, particularly when the crop lies only over a partial width of the cutter head 18, but the crop is standing at other points. If the plugging has not yet been resolved on the first try, the procedure according to step 420 can optionally be repeated another one or more times. Only then is a warning of a lack of success issued (step 426), so that the operator himself can intervene.

There is the possibility, in the procedure according to FIG. 3, of providing the operator interface 44 with an input capability with which the operator can call up the settings according to step 420 in order to remedy a disruption.

The settings of the actuators produced by the flow charts according to FIGS. 3 and 4 can be overridden in a substantially known way by operator inputs by means of the operator interface 44 and thus, if necessary, can be improved. Moreover, they can be finely tuned further by automatic control circuits with closed or open loops.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A cutter head for a harvesting machine, comprising: a cutterbar for cutting crop from a field, a reel with reel fingers disposed above the cutterbar and a cross conveyor for conveying the cut crop to a rear discharge opening, wherein the reel comprises reel arms that can be driven about an axis of rotation, reel finger carriers supported rotatably about lengthwise axes on the reel arms, with reel fingers mounted thereon, and an externally powered actuator connected to an electronic control unit to adjust the angle of rotation of the reel finger carriers relative to the reel arms, and the electronic control unit can be operated to adjust the actuator in dependence on at least one property of the crop to be harvested;

wherein the property of the crop to be harvested concerns at least one of the orientation of the stalks of the crops and the transport behavior of the crop in the pickup region of the cutter head.

2. The cutter head according to claim 1, wherein the property can be detected by a sensor, entered into a map, or transmitted to the electronic control unit by an operator interface.

3. The cutter head according to claim 2, wherein the electronic control unit can be operated to call up, by signals from the operator interface, a setting of the actuator that is suitable for collection of lodged crop or for remedying a disruption of the transport behavior of the crop in the collection region of the cutter head.

4. The cutter head according to claim 3, wherein the operator interface is configured to receive an input relative to the orientation of the lodged crop from the operator by a keyboard system or a joystick, which can be actuated in correspondence with the direction in which the lodged crop lies, and the electronic control unit can be operated to control the actuator by the input.

5. The cutter head according to claim 3, wherein the electronic control unit is connected to a memory, in which are stored various data for adjusting the actuator in dependence on the presence of lodged crop that is to be picked up or the presence of a disruption of the transport behavior of the crop in the pickup region of the cutter head as well as additional data that are dependent on the presence of lodged crop to be picked up, for the control of actuators to adjust the cutter head height or the position of the reel in the forward direction or the position of the reel in the vertical direction or the speed of rotation of the reel.

6. The cutter head according to claim 1, wherein the electronic control unit is connected to a sensor for detection of lodged crop located in front of the cutter head, to a stored map in which positions of the lodged crop located in front of the cutter head and orientation of the lodged crop are stored, or to a sensor for detection of disruptions in the transport behavior of the crop in the pickup region of the cutter head, and the electronic control unit can be operated to control the actuator dependent on the map or the signals from at least one of the sensors.

7. The cutter head according to claim 6, wherein the electronic control unit can be operated to control the actuator in dependence on the presence of lodged crop to be picked up.

8. The cutter head according to claim 6, wherein the electronic control unit can be operated to control additional actuators for adjusting the cutter head height or the position of the reel in the forward direction or the position of the reel in the vertical direction or the speed of rotation of the reel on the basis of signals of at least one sensor or data entered into the map.

9. A harvesting machine with the cutter head of claim 1.

* * * * *